C. H. JOHNSON.
ELAPSED TIME RECORDER.
APPLICATION FILED FEB. 21, 1912.
1,059,468.
Patented Apr. 22, 1913.
6 SHEETS—SHEET 1.
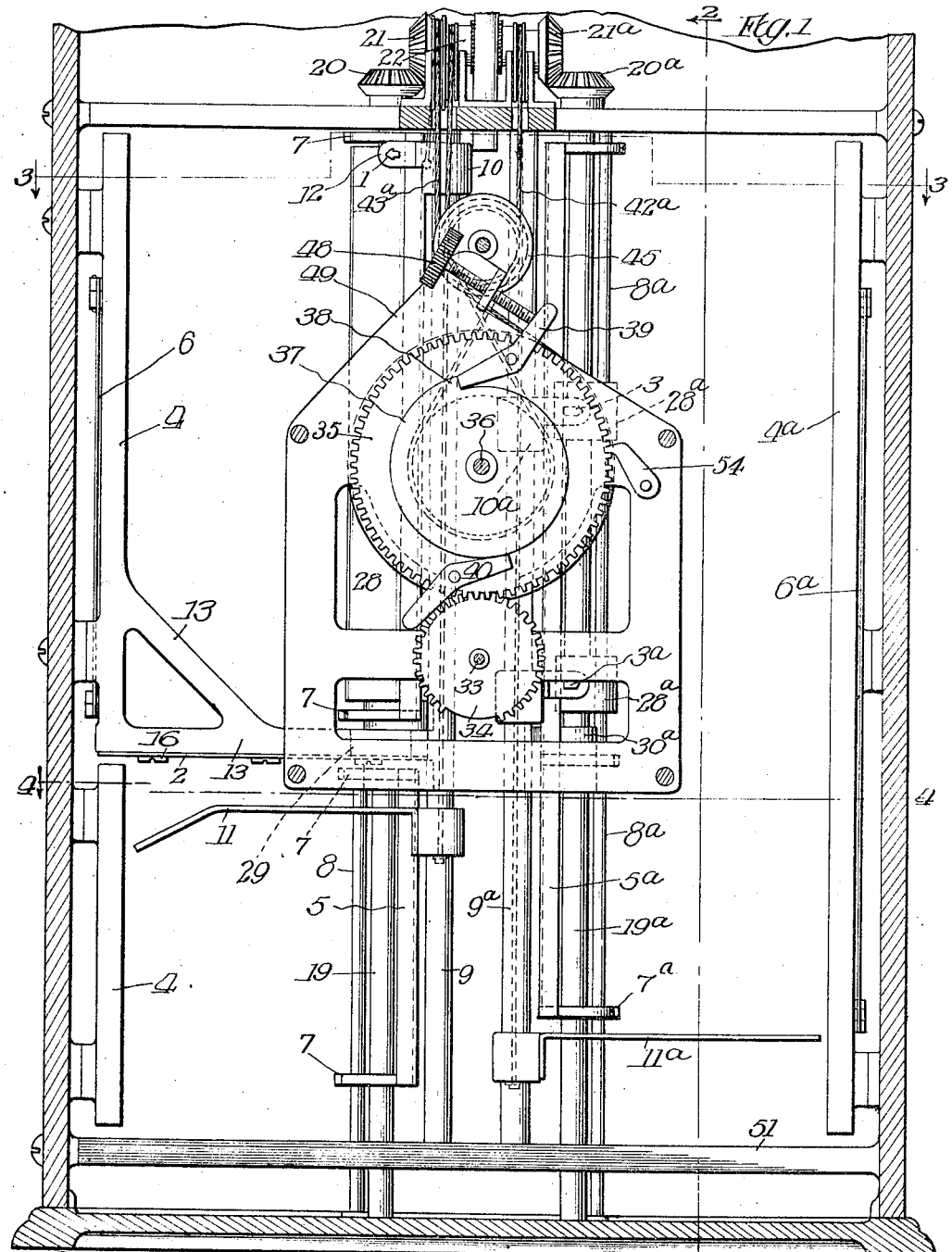

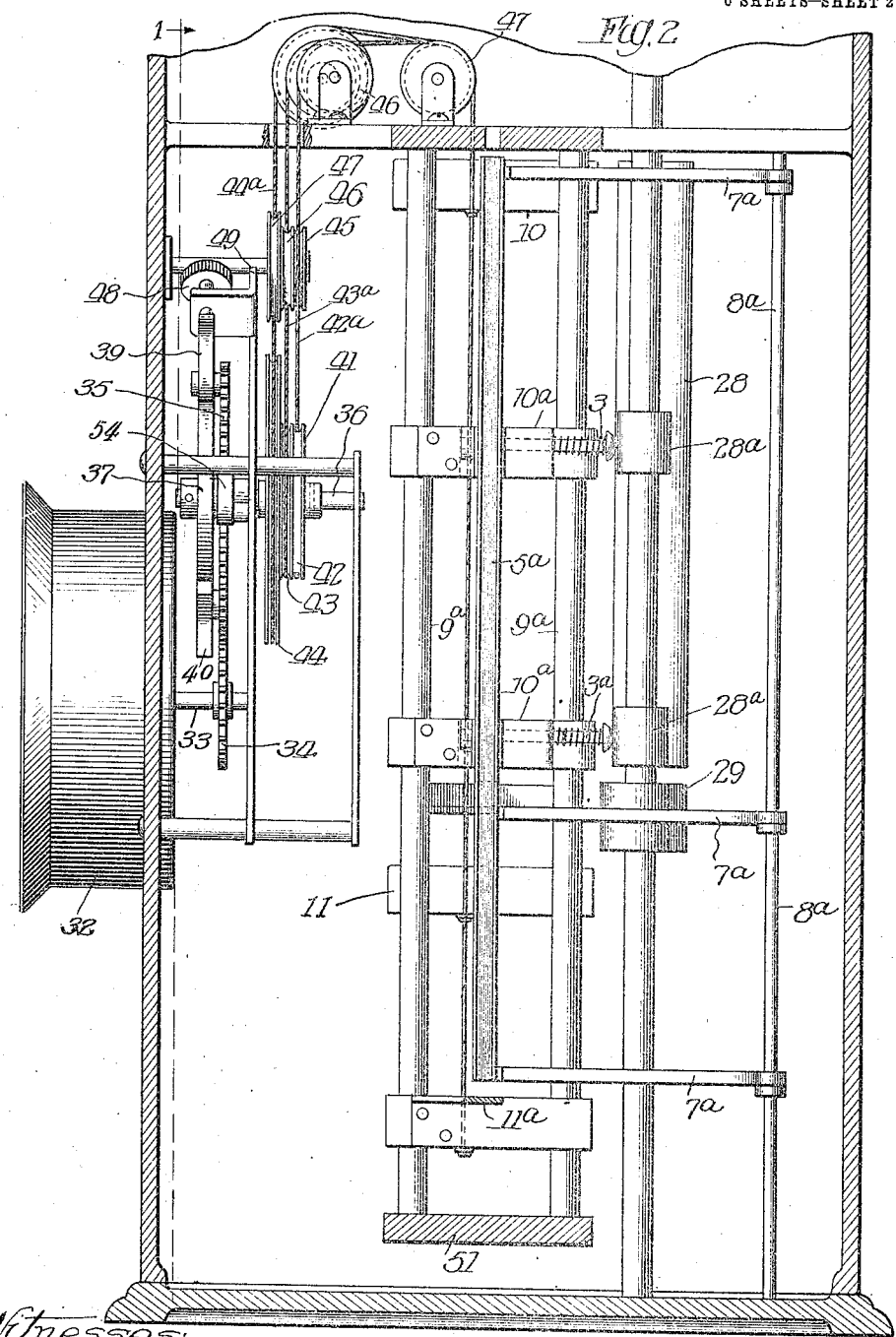

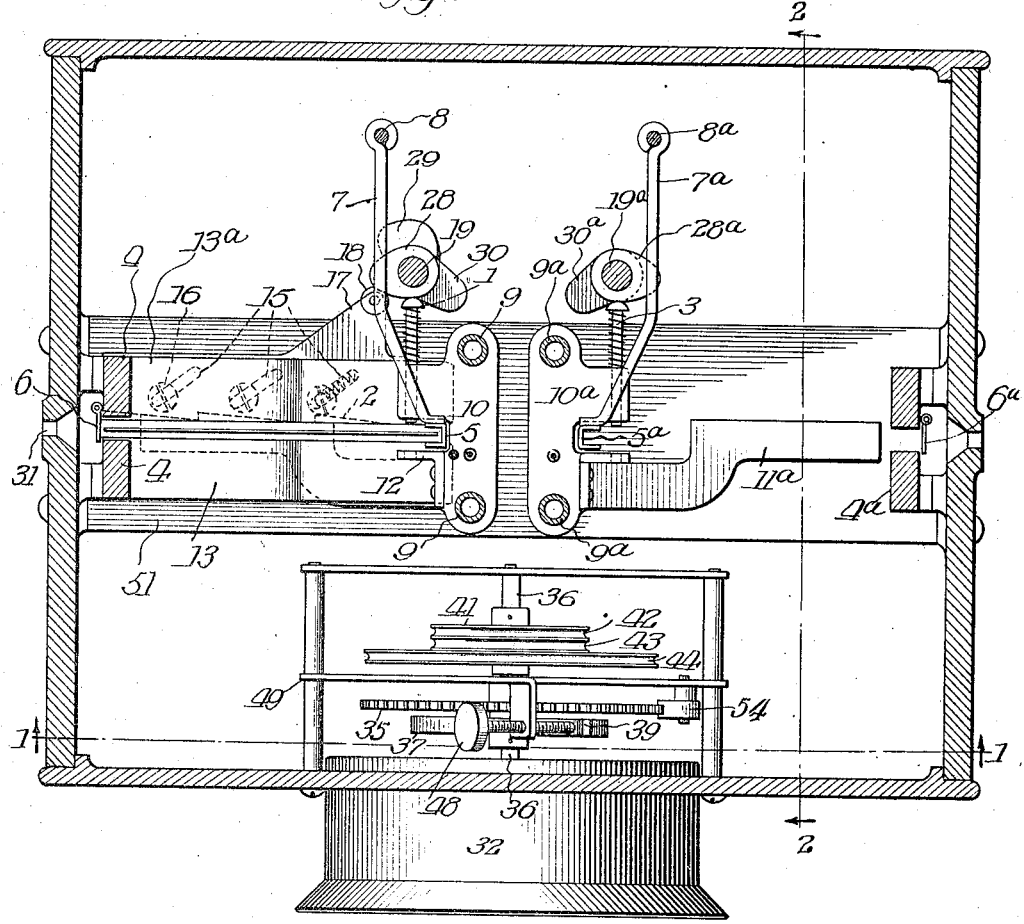

C. H. JOHNSON.
ELAPSED TIME RECORDER.
APPLICATION FILED FEB. 21, 1912.

1,059,468.

Patented Apr. 22, 1913.
6 SHEETS—SHEET 4.

Witnesses:

Inventor
C. H. Johnson
By Barton & Foek
Attys

C. H. JOHNSON.
ELAPSED TIME RECORDER.
APPLICATION FILED FEB. 21, 1912.

1,059,468.

Patented Apr. 22, 1913.

6 SHEETS—SHEET 6.

Witnesses:

Inventor:
C. H. Johnson
by Barton & Folk,
Attys.

UNITED STATES PATENT OFFICE.

CHARLES H. JOHNSON, OF EAST ORANGE, NEW JERSEY.

ELAPSED-TIME RECORDER.

1,059,468.  Specification of Letters Patent.  Patented Apr. 22, 1913.

Application filed February 21, 1912. Serial No. 679,097.

*To all whom it may concern:*

Be it known that I, CHARLES H. JOHNSON, citizen of the United States, residing at East Orange, in the county of Essex and State of New Jersey, have invented a certain new and useful Improvement in Elapsed-Time Recorders, of which the following is a full, clear, concise, and exact description.

My invention relates to elapsed-time recorders of the class in which a work card is inserted in the recording machine at the beginning and at the end of the period of time to be measured. Its object is to provide a recorder which will, when the card is inserted at the beginning of the period above referred to, mark the hour on said card, and which will, when the card is inserted at the end of period above referred to, record on said card the number of hours that have elapsed and preferably also indicate without further computation the amount earned by the employee at the particular rate per hour which he is paid.

My invention and the several features thereof may be more readily understood by reference to the accompanying drawings, in which—

Figure 5:
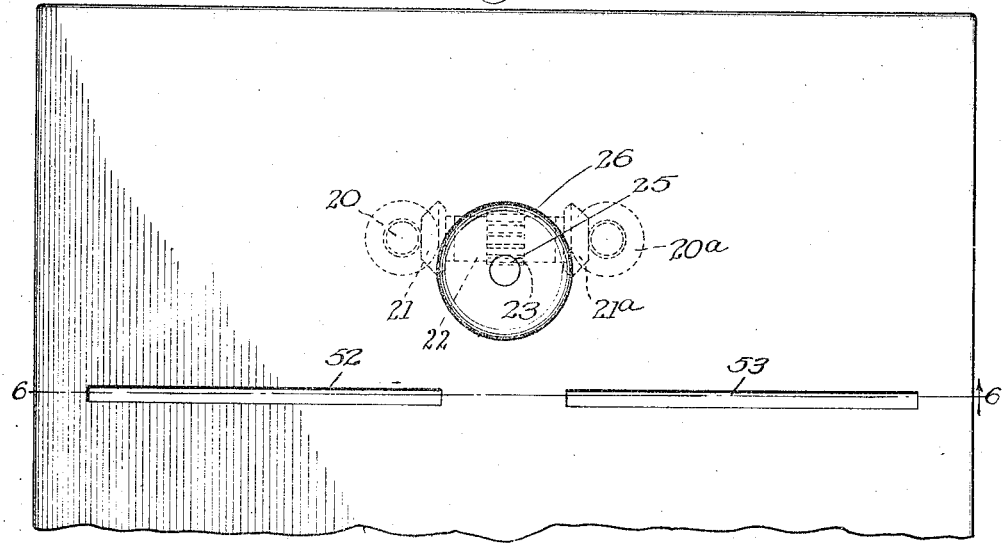
Figure 6:
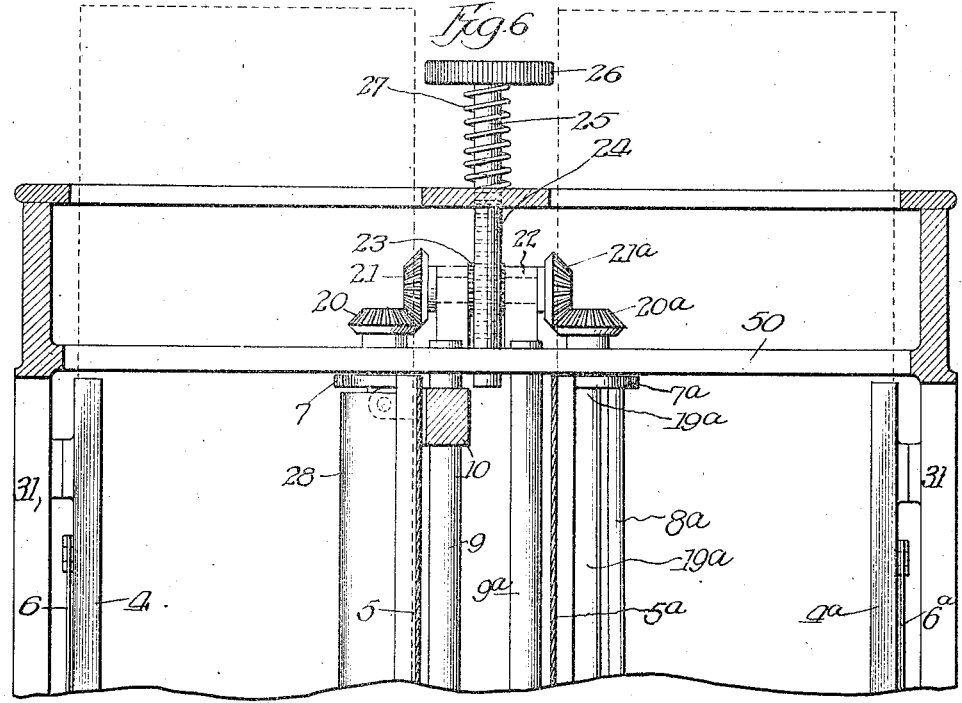
Figure 7:
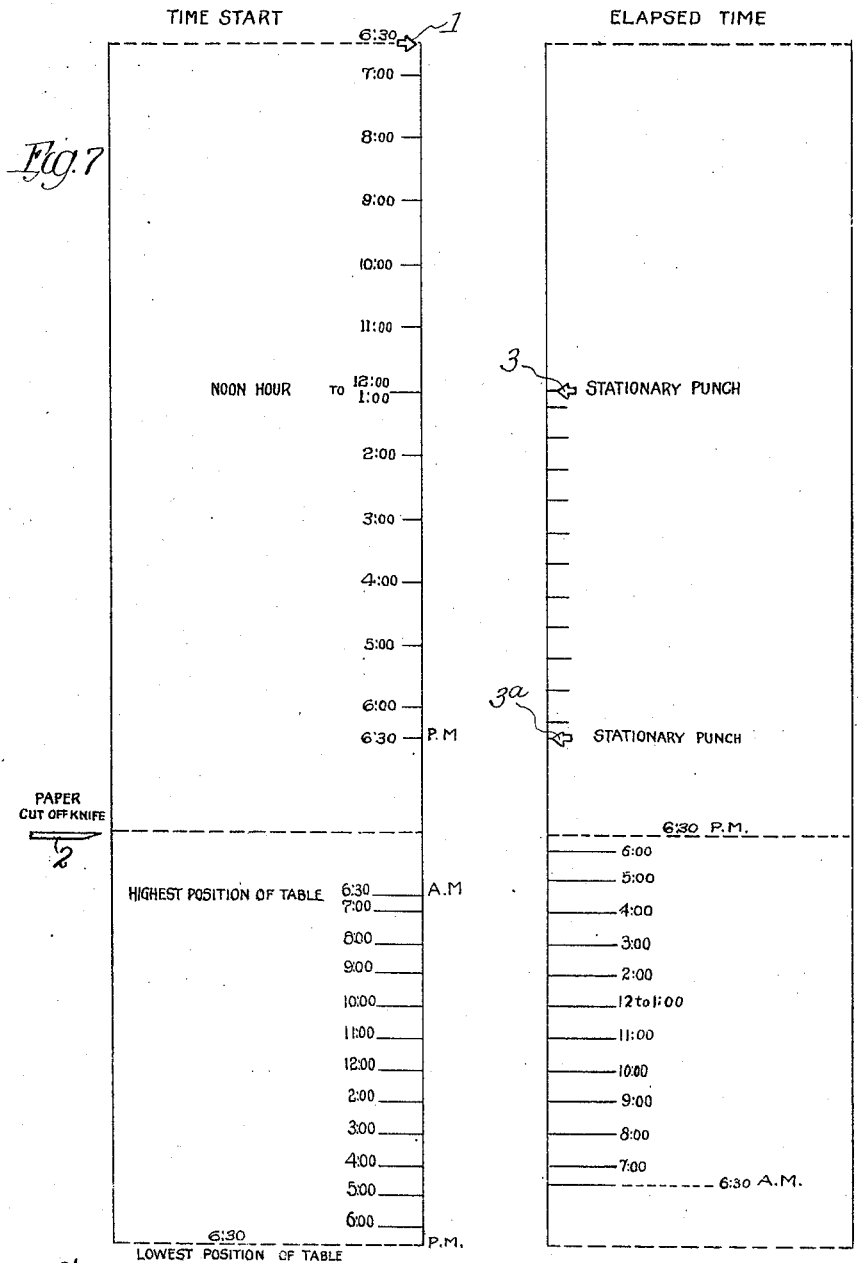
Figure 8:
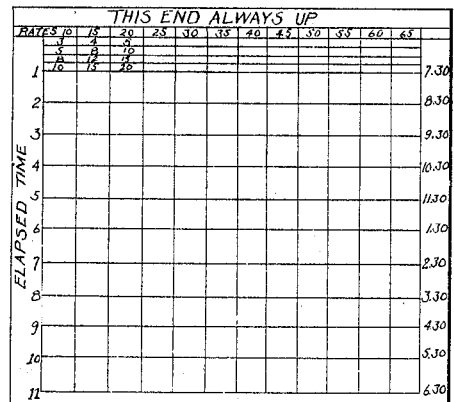
Figure 10:
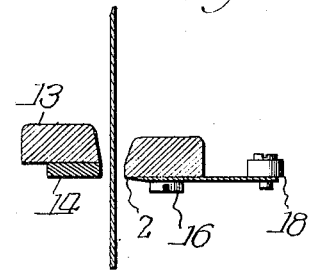
Figure 9:
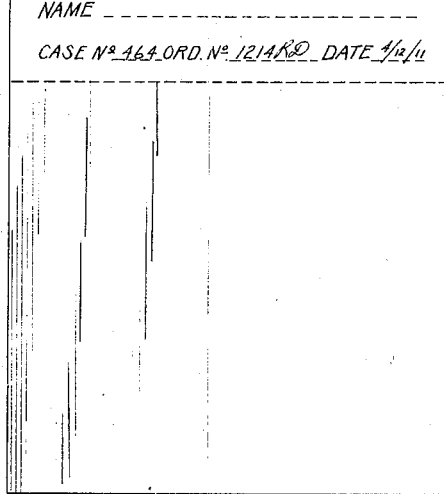

Figure 1 is a vertical section on the line 1—1 of Figs. 2 and 3, the interior mechanism of the machine being shown in vertical elevation. Fig. 2 is a vertical section on the lines 2—2 of Figs. 1 and 3. Fig. 3 is a horizontal section on the line 3—3 of Fig. 1; Fig. 4 is a fragmentary detail section on the line 4—4 of Fig. 1; Fig. 5 is a partial top plan view of the exterior of the machine; Fig. 6 is a fragmentary vertical section on the line 6—6 of Fig. 5; Fig. 7 is a diagrammatic view representing for the different hours of a work day the relative positions of the punches and tables in the two slots that receive the work card. Fig. 8 is a view of a work card which is adapted for use with the machine of my invention; and Figs. 9 and 10 are horizontal and vertical sectional details, respectively, of the card cutting mechanism.

Like reference characters refer to like parts throughout the several views.

A general idea of the invention may be more readily obtained by first referring to the diagram, Fig. 7, in connection with the card shown in Fig. 8. The left hand portion of Fig. 7 represents the time-start slot into which the card is dropped when the job is commenced. The right hand portion of Fig. 7 represents the elapsed-time slot into which the card is dropped when the job is completed. The scale at the upper right hand side of the time start slot represents the rate at which the punch 1, represented by the arrow, travels downwardly, such travel being controlled by clockwork in the manner hereinafter described. The scale at the lower right hand end of the time start slot represents the rate of travel of a movable table forming the bottom of the time start slot. It will be noted that both the punch and the table are at their highest positions at the beginning of the day's work and travel downwardly, the punch traveling, however, at twice the rate of the speed of the table. The upper and the lower scales of the time start slot thus indicate, respectively, the positions in which the punch and the table will be at the times indicated by the scales.

In the time start slot is a knife 2, the purpose of which is to cut off the lower portion of the work card. This knife has no vertical movement and hence the table recedes therefrom. The knife cuts the card on the dotted line indicated in the time start slot, that portion of the card being cut off that lies between said knife and the table. The length of the card remaining after this cutting operation is thus dependent upon the hour at which the card is inserted, the later the insertion the less the length of the card. This provides a shifting zero point or base line and thus permits of the use of a card, such as is shown in Fig. 8, in which both the elapsed-time scale and the time start scale run in the same direction and in which the hour the job is commenced and the time employed thereon are directly recorded on the card, as will hereinafter more fully appear.

The punch in the elapsed-time slot marks on the card the length of time which has elapsed since the card was inserted in the time start slot. This latter punch, designated by the arrow 3, has no vertical movement. A similar punch 3ª, exactly one card scale distant from the punch 3, is also preferably employed. If a card is put in the time start slot at any time during the day and cut off and then immediately transferred to the elapsed-time slot, the upper punch 3 will record at zero or the beginning of the elapsed time scale; and the lower punch 3ª will record at the lowermost point of the elapsed time scale. This double record indicates that no time has been put on the job.

Since the table 11ª travels upward, if the card is put in the elapsed-time slot at any time during the day later than it was cut off in the time start slot, the punch 3 in the elapsed-time column will record on the card scale the elapsed time and the punch 3ª will punch below the card scale, which latter punch is in this instance unnecessary. If the job were always begun and finished on the same day, or more broadly speaking on the same scale trip, punch 3 only would be necessary. But if a job is begun on one day, or on one scale trip, and finished on the next at some hour earlier than the start, it is obvious that the punch 3 will be above the card scale and hence the punch 3ª does the recording. This provision of the two punches 3 and 3ª is a decided advantage in that a single card can be used to record the working time corresponding to one day's work even though such working time represents work begun one day and finished a succeeding day. The card can be marked in the usual or in some other suitable manner with the date of the month on which the job is started and the day finished.

The scale at the bottom of the elapsed time slot indicates the position, at the times marked on the scale, of a movable table forming the bed plate or bottom of the slot. It will be noted that said table travels in a direction opposite to the travel of the table in the time start slot. Thus the table in the elapsed-time slot is at its lowest position at the beginning of the day's work and travels upward at the same rate that the table in the time start slot travels downward.

The card designed to be used with the machine of my invention is shown in Fig. 8. The intermediate portion of the card provides space for the name of the workman and other data usually placed on such cards. The upper portion of the card is ruled horizontally to indicate at the left hand edge thereof the elapsed-time, that is the number of hours or fractions thereof the workman was employed on the particular piece of work. At the right hand edge of the card is the time start scale. The horizontal ruling thus represents time.

The vertical columns of the card indicate rate of pay, the total amount due at a given rate for the time indicated by the horizontal line being printed on the card immediately above such line, directly below the given rate noted at the top of this column. Thus at a glance the card, when marked by the machine, will indicate the time at which the work was begun, the number of hours occupied thereon and the amount of pay due the workman at any of the rates indicated by the vertical columns of the card.

Assuming that a job is commenced at 10.00 a. m. the employee will take his work card and drop it into the time start slot where it will fall by gravity until the lower end of the card rests upon the table, which, in the case assumed, is at the position indicated by the scale for 10.00 a. m. Upon the operation of the push knob, in the manner hereinafter described, the punch 1 in the time start slot will punch a hole in the right hand side of the card opposite the hour 10, this being the position at which the time start punch will have arrived. At the same time the knife 2 will sever the card upon the dotted line indicated in Fig. 7, all that portion of the card being cut off that lies between said knife and the table. The card will also be ejected from the machine and returned to the workman, as will hereinafter be described. Upon the completion of this particular job, say at 4.00 p. m., the card is placed in the elapsed-time slot where it will drop onto the table which is then at the position indicated for 4.00 o'clock. Upon operating the elapsed time punch, said punch will mark the card at 5, thus indicating that five working hours have elapsed between the beginning and completion of the job. After being thus finally punched the card will be ejected from the machine and returned to the workman.

The card is preferably perforated along the dotted line indicated in Fig. 8 in order that after the card has been finally punched the lower portion thereof may be torn off, thus finally providing cards of uniform size suitable for filing away.

The time start slot is formed by the guide walls 4, 4 upon one side and the longitudinal punching 5 of U-shape cross section upon the other side. The small spring pressed shutter 6 normally prevents the card from falling out of the slot. The U-shaped guide 5 is supported by arms 7 which are pivoted upon the vertical rod 8. The guide walls 4 and the punching 5 of the time start slot are each made of two sections, as shown in Fig. 1, in order to permit the knife 2 to sever the work card.

The elapsed-time slot is formed by guide walls 4ª, upon one side, and the U-shaped punching 5ª upon the other. The guide 5ª is mounted in a manner similar to the guide 5, that is upon arms 7ª pivoted upon the rod 8ª. A spring pressed shutter 6ª is used to prevent the card from getting out of place in the elapsed-time slot.

The vertical parallel rods 9, 9 constitute supports and guides for the movable tables 10 and 11, which tables are moved downwardly at different rates of speed, as hereinbefore stated, by a cable operated by clockwork, as will hereinafter be described. The punch 1 and the die 12 in which it operates are mounted on the table 10. The table 11ª in the elapsed-time slot is likewise guided by rods 9ª, but, as before stated, travels in an opposite direction from that of the table 11. The tables 10ª are, however, fixed to the shafts 9ª and hence the punches 3 and 3ª carried thereby do not have any vertical travel, as hereinbefore stated.

The lower end of the upper sections of the guides 4 of the time start slot are provided with inwardly extending horizontal arms 13, 13ª, upon the under surfaces of which are mounted the knife 2 and the knife block 14, respectively. The knife 2 has a series of inclined slots 15 therein through which pass the securing shoulder screws 16, the knife being thus adapted to be moved toward its knife block with a shearing action. The back edge of the knife at one end has a projection 17 upon which is carried a roller 18, which roller is adapted to be engaged by a cam to operate the knife, as will hereinafter be described.

The punches, the knife which severs the card and the arms which operate the U-shaped punching to eject the card from the machine are all operated from two vertical shafts 19, 19ª which are journaled to rotate in the frame work of the machine. The upper ends of said shafts terminate in bevel gears 20, 20ª which mesh with similar gears 21, 21ª carried upon the opposite ends of a short horizontally disposed spindle 22. The spindle 22 is provided with a pinion wheel 23 which meshes with a rack 24 carried upon the lower end of a plunger 25. The plunger 25 projects through the upper casing of the machine (see Figs. 5 and 6), and is provided upon its upper end with an operating button or knob 26 adapted to be manually operated to depress said plunger. A coil spring 27 returns the plunger to normal when pressure is removed from the knob 26. Thus the depression or return to normal of the push-knob 26 rotates in the one or the other direction the two vertical shafts 19, 19ª. Mounted upon said shafts are cams adapted to operate the dies, cutting mechanism and ejecting mechanism in the required sequence.

Assuming that a card has been dropped in the time-start slot, the depression of the plunger knob 26 rotates the shaft 19. The cam 28 carried by said shaft operates the punch 1 against its die 12. Since the punch 1 travels on its guide rods 9, 9, the cam 28 has a length equal to the travel of the punch in order that it may operate the same at any position of travel. During such rotation of the shaft 19 the knife 2 is brought into operation to sever the card by the cam 29, carried by the shaft 19, such cam engaging the roller 18 carried by the rear projection 17 of the knife blade. The further rotation of the shaft 19 carries the cam 28 into position such that the punch 1 is retracted to normal. The cam 29, however, is so shaped as to hold the knife in its operated position until the card is ejected from the slot. The knife blade thus forms a temporary support for the upper portion of the card. Immediately after the retraction of the punch, the further rotation of the shaft 19 brings the cam 30, carried by said shaft, into engagement with the arm 7, thus quickly moving said arm and the punching 5 carried thereby laterally to eject the card through the opening 31 in the side casing of the machine. When pressure is removed from the knob 26, the plunger is restored to normal, likewise returning the shaft 19 and the cams carried thereby to their normal positions shown in Fig. 3. When released from the action of cam 29, the knife 2 is retracted to normal by the coiled springs located in slots 15 of said blade.

The shaft 19ª and the cams carried thereby are operated in a manner similar to that just described. For convenience the same operating knob 26 is used whether the card be dropped into the time-start or the elapsed-time slot. Since the punches 3 and 3ª of the elapsed time slot do not travel, the cams 28ª which operate the same need not have the length of the cam 28. The shaft 19ª carries a cam 30ª, which in function and operation corresponds to the cam 30 of the shaft 19.

The mechanism for raising and lowering the tables 11, 11ª and 10 is controlled by standard clockwork inclosed in the clock-casing 32. The shaft 33 which carries the hour hand of the clock is extended through the rear wall of the clock casing, and mounted on said extension is a gear wheel 34 which meshes with the intermediate gear 35 loosely mounted on the shaft 36. Secured to the shaft 36 is a driving wheel 37 provided with a tooth 38 adapted to engage with one or the other of the pawls 39, 40. Said pawls 39, 40 are pivoted to the gear wheel 35 and, when in engagement with the wheel 37, drives said wheel and the shaft 36 upon which it is mounted. The inner end of the shaft 36 has secured thereto a drum 41 provided with grooves 42, 43, 44 for the reception of the cables. The cables 42ª and 43ª are secured to and lie in the grooves 42, 43, respectively, extend over suitable pulleys 45, 46, 47, and are connected at their opposite ends to the tables 11ª and 11, respectively. Said cables are so wound in the grooves 42, 43 as to move said tables, as hereinbefore stated, in opposite directions. Since said grooves 42, 43 have equal circumferences the tables 11 and 11ª travel at the same rate of speed. Secured to and wound in the other groove 44 is a cable 44ª, the opposite end of which is secured to the table 10 which carries the time start punch 1. The circumference of the groove 44 is twice that of the groove 43, whereby it follows that the table 10 travels at twice the rate of speed of the table 11.

A set-screw 48 carried by the frame plate 49 projects into the path of movement of the free ends of pawls 39, 40, thereby lifting said pawls out of engagement with the tooth 38 and releasing the wheel 37. Thereupon the weight of the table 11ᵃ, which is weighted to act as a counterweight to the tables 11 and 10 falls to its normal lowermost position, at which position one or the other of said pawls 39, 40 comes into engagement with the tooth 38 and again connects said tables with the clock-work mechanism.

As shown in Fig. 1, a portion of the circumference of the gear wheel 34, corresponding to any desired period of time, is preferably not provided with cogs for intermeshing with the gear 35, it following that during such time there is no drive of the gear 35 and the table operated thereby. The pawl 54 prevents a backward movement of gear 35 and a consequent return to normal position of tables 10, 11 and 11ᵃ during this period. The usual noon recess, at which time work is suspended, is thus provided for.

The walls forming the casing of the machine are preferably held together by cross braces 50 and 51 at the top and bottom respectively, said braces also serving as convenient supports for the mechanism inclosed in the casing. The casing is provided in its cover with openings 52, and 53 to the time-start and elapsed-time slots respectively.

What I claim is:—

1. In a recording machine, the combination with positioning means for holding a card deposited in said machine, cutting mechanism associated with said positioning means for providing a base line for the deposited card corresponding to the time of deposit, a recording device associated with said positioning means for subsequently indicating on said card at a point measured from said base line the time intervening between said cutting and said recording operations, and clock-controlled mechanism for imparting relative movement between said positioning means and said cutting mechanism and between said positioning means and said recording device.

2. In a recording machine, the combination with time-operated movable mechanism for holding a card deposited in said machine at a position corresponding to the time of deposit, cutting mechanism for severing the card to a length corresponding to the time of deposit, and means for recording on said severed card at a point measured from the severed end of the card the duration of movement of said time-operated movable mechanism during the interval between said cutting operation and said recording operation.

3. In a recording machine, the combination with guide ways forming a slot for receiving a work-card, of a movable table constituting the end of said slot, clock-controlled mechanism for moving said table, a knife extending transversely of said slot beyond the farthest point of travel of said table, means for operating said knife to sever from said card an end portion thereof and thereby to provide a card having a length corresponding to the hour at which the card is severed, and a marking device, toward which said table travels, for making a time record on said severed card.

4. In a recording machine, the combination with means for cutting off one end of a work-card, of time-controlled means for presenting said work card to said cutting means, thereby providing a card having a length corresponding to the time at which the card is inserted in the machine, a marking device, a movable table against which the severed end of the card rests arranged to locate said previously cut card in position to be operated upon by said marking device, and time-controlled mechanism arranged to move said table with respect to said marking device.

5. In a recording machine, the combination with means for cutting off the lower end of a work-card, of time-controlled means for presenting said work card to said cutting means, thereby providing a card having a length corresponding to the time at which the card is inserted in the machine, an elapsed-time marking device, a movable table against which the severed end of the card rests arranged to support the lower end of said previously cut card and to place said card in position to be operated upon by said marking device, and time-controlled mechanism arranged to advance said table toward said marking device.

6. In a recording machine, the combination with guideways constituting a time-start and an elapsed-time slot, of movable members for positioning a card in said slots, clock-controlled mechanism for moving said movable members in opposite directions at the same rate of speed, cutting mechanism associated with said time-start slot, means for operating said cutting mechanism to provide a base line on which said card is adapted to be supported on the movable member of said elapsed-time slot, and a recording device associated with the elapsed-time slot and adapted to mark a time record on a card supported by said movable member of the elapsed-time slot.

7. In a recording machine, the combination with guideways constituting a time-start and an elapsed-time slot, of movable tables constituting the ends of said slots, clock-controlled mechanism for moving said tables in opposite directions at the same rate of speed, a knife associated with the time-start slot, means for operating said knife to cut off from the lower end of a card inserted in the time-start slot the portion thereof lying between said knife and the movable end of the slot, and a recording device associated with the elapsed time slot and adapted to mark a time record on said previously cut card when the same is held upon the table in said elapsed time slot.

8. In a recording machine, the combination with guideways constituting a time-start and an elapsed-time slot, of movable members for positioning a card in said slots, clock-controlled mechanism for moving said movable members in opposite directions at the same rate of speed, a recording device associated with said time-start slot, means actuated by said clock-controlled mechanism to impart travel to said recording device in the same direction as the movable member of the time-start slot and at twice the rate of speed thereof, cutting mechanism associated with said time-start slot, means for operating said cutting mechanism to provide a base line on which said card is adapted to be supported on the movable member of said elapsed-time slot, and a recording device associated with the elapsed-time slot and adapted to mark a time record on a card supported by said movable member of the elapsed-time slot.

9. In a recording machine, the combination with guideways constituting a time-start and an elapsed-time slot, of movable tables constituting the ends of said slots, clock-controlled mechanism for moving said tables in opposite directions at the same rate of speed, a recording device associated with said time-start slot, means actuated by said clock-controlled mechanism to impart travel to said recording device in the same direction as the movable end of the time-start slot and at twice the rate of speed thereof, a knife associated with the time-start slot, means for operating said knife to cut off from the lower end of a card inserted in the time-start slot the portion thereof lying between said knife and the movable end of the slot, and a recording device associated with the elapsed-time slot and adapted to mark a time record on a card held therein and having its lower end resting against the movable table of said elapsed time slot.

10. In a recording machine, the combination with guideways constituting a time-start and an elapsed-time slot, of movable members for positioning a card in said slots, clock-controlled mechanism for moving said movable members in opposite directions at the same rate of speed, cutting device associated with said time-start slot for providing a base line on which said card is adapted to be supported on the movable member of said elapsed-time slot, a recording device associated with the elapsed-time slot and adapted to mark a time record on a card supported by said movable member of the elapsed-time slot, cam mechanism for operating said cutting and recording devices, and an operating plunger operatively associated with said cams.

11. In a recording machine, the combination with traveling positioning means for positioning a card deposited in said machine, of cutting mechanism for severing a card thus positioned, a pair of recording devices separated by a distance corresponding to a day's travel of said positioning means, and clock-work mechanism for imparting relative movement between said positioning means and said cutting mechanism and between said positioning means and said recording device.

12. In a recording machine, the combination with guideways constituting a time-start and an elapsed-time slot, of movable members for positioning a card in said slots, clock-controlled mechanism for moving said movable members in opposite directions at the same rate of speed, cutting mechanism associated with said time-start slot, means for operating said cutting mechanism to provide a base line on which said card is adapted to be positioned on the movable member of said elapsed-time slot, and a pair of recording devices associated with the elapsed-time slot and separated by a distance corresponding to a day's travel of said movable members.

In witness whereof, I, hereunto subscribe my name this 20th day of February, A. D., 1912.

C. H. JOHNSON.

Witnesses:
GEORGE E. FOLK,
N. A. SCHNEDLER.